April 7, 1936.  W. M. THOMAS  2,036,554
SOUND RECORD AND METHOD OF PRODUCING SAME
Filed May 13, 1929   2 Sheets-Sheet 1
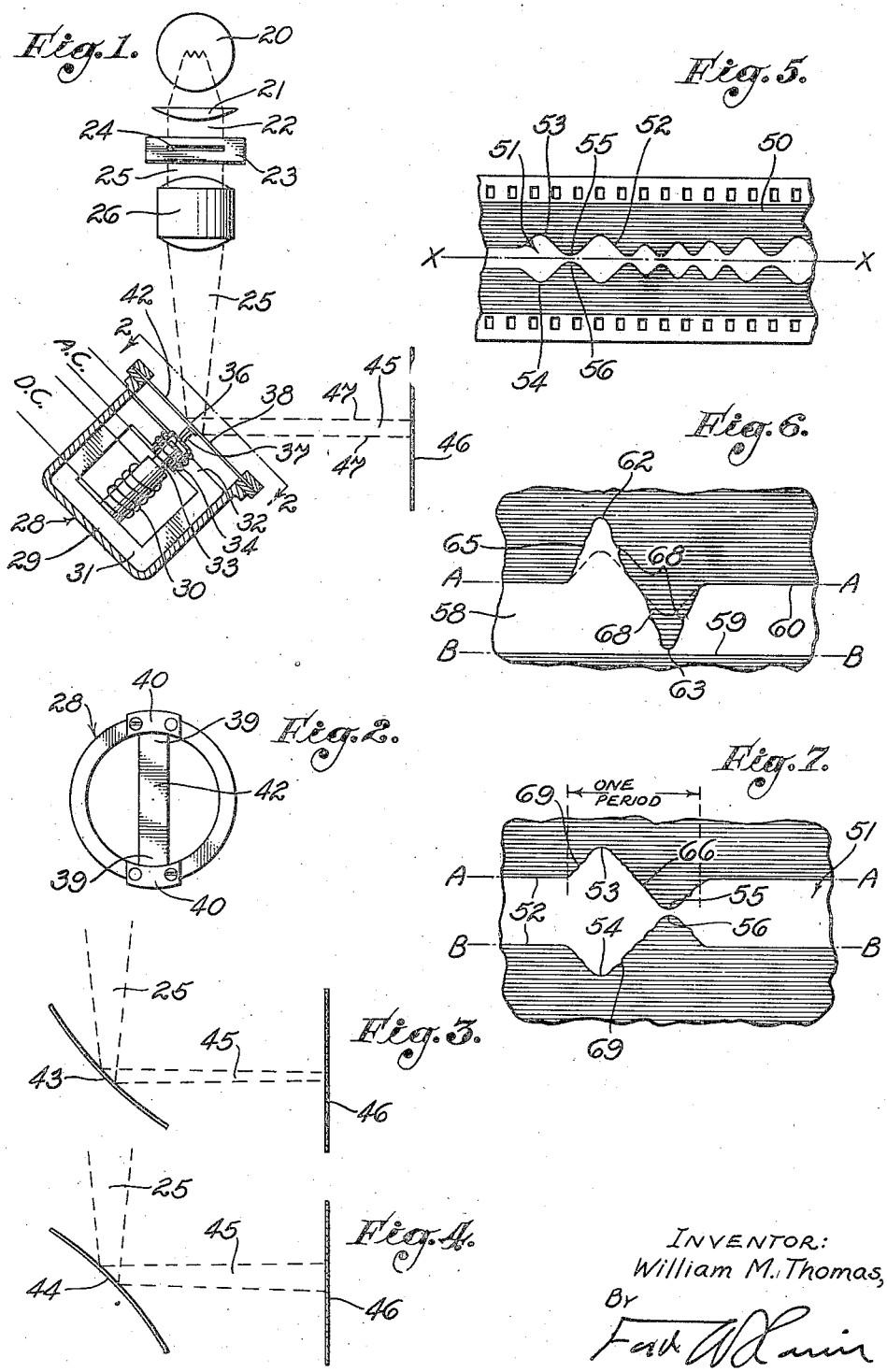
INVENTOR:
William M. Thomas,
By
ATTORNEY.

April 7, 1936.  W. M. THOMAS  2,036,554

SOUND RECORD AND METHOD OF PRODUCING SAME

Filed May 13, 1929  2 Sheets-Sheet 2

INVENTOR:
William M. Thomas,
By
ATTORNEY.

Patented Apr. 7, 1936

2,036,554

UNITED STATES PATENT OFFICE 2,036,554

SOUND RECORD AND METHOD OF PRODUCING SAME

William M. Thomas, Los Angeles, Calif.

Application May 13, 1929, Serial No. 362,847

7 Claims. (Cl. 274—5)

My invention relates to the art of recording sound vibrations by light rays and it has a particular utility in the talking motion picture industry.

My invention particularly relates fundamentally to the method of recording sound on a film, in which the sound vibrations control the cross-sectional area of light beam which reaches the negative film as distinguished from the method in which the sound vibrations control the intensity of the light which reaches the negative film, though small changes in intensity of the projected beam take place in my system due to the light rays being concentrated to a greater or lesser degree as the width of the beam varies.

It is a well established fact of physics that the sound waves of a tuning fork are quite smooth and harmonious in shape, and the sounds produced by instruments and voices are similar to the tuning fork waves, except for certain characteristics which appear on the sound waves as very small waves which give the sound waves a somewhat rough appearance as compared with the tuning fork waves. It is these small characteristic waves or overtones which give the different quality or timber of the instrument or voice.

It is an object of my invention to provide a method of producing a light recordation of sound vibrations which will faithfully register the small characteristic waves or overtones.

Another object of the invention is to provide a light recordation in which the sound wave is accurately recorded and will be accurately reproduced.

Another object is to provide a light recordation of sound waves, in which the sides of the light band have relatively shallow curves in which the characteristic waves or overtones appear.

A further object of my invention is to provide a method of printing the positive sound record from the negative which includes passing the light rays from the negative to the positive film through a lens.

Another object of the invention is to provide a method of making a sound record in which the negative during recording is run at a speed greater than normal so as to make the curves of the light band comparatively shallow in order to better record the characteristic waves or overtones, and shortening the length of the curves of the light bands when printed on the positive so that the positive record need not be run faster than a normal speed and yet retain the characteristic waves or overtones.

Other objects of my invention will be made evident in the following description.

In the accompanying drawings:

Fig. 1 is a view illustrating the means for making the sound record.

Fig. 2 is a section on the line 2—2 of Fig. 1.

Figs. 3 and 4 are diagrams illustrating the operation of the means which controls the shape of the light record impressed on the film.

Fig. 5 is a view of a positive film on which my light record is printed.

Fig. 6 is an enlarged view of the light record ordinarily used.

Fig. 7 is an enlarged view of my light record, showing a recordation of the same sound vibration as is recorded on the film of Fig. 6.

Figure 8:
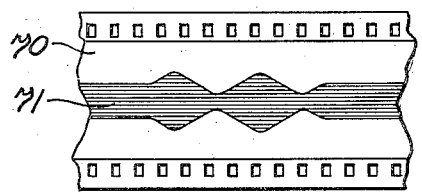
Fig. 8 is a negative film on which a light record is made with the film travelling at double speed.
Figure 11:
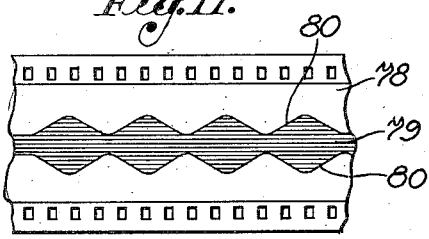
Fig. 11 is a negative film on which the light record is made with the film travelling at double speed.

In Fig. 1 the numeral 20 represents a light source and the numeral 21 represents a condenser for directing the light rays in a beam 22. In the path of the beam 22 is a plate 23 having a slit 24 which acts as a masking means and passes a shaft of light 25 through a lens 26. The shaft of light 25 is of the same cross-sectional shape as the slit 24.

The shaft of light 25 passes from the lens 26 to a control apparatus designated by the numeral 28. The control apparatus operates in response to variations in electrical current and preferably includes as a part thereof a dynamic speaker unit 29 which has a coil 30 having a magnetic circuit 31. Placed between poles 32 and around a core 33 is a vibratory element 34 carrying an A. C. coil 36. Extending from the vibratory element 34 is a connecting rod 37 which is secured to the central part of a flexible member 38. The member 38 is preferably elongated in the plane of the shaft of light 25 and is in the form of a strip which has both ends 39 gripped by clamps 40. The outer face of the strip 38 is a reflector-face 42.

When the control apparatus is energized the vibratory element 34 is moved back and forth and the strip 38 is flexed in one direction, as indicated at 43 in Fig. 3, and in the opposite direction, as indicated at 44 in Fig. 4. The control apparatus is disposed so that the reflector-face is in the path of the shaft of light 25, and preferably so that the shaft of light is reflected as a reflected beam 45 at an angle of ninety degrees.

The numeral 46 denotes a negative film against which the reflected shaft of light impinges. The film is moved by apparatus not shown in a plane at right angles to the plane of the drawings. When the strip 38 is flat as in Fig. 1, the side lines 47 of the reflected beam 45 have substantially the same angular relation as the side lines of the shaft of light 25; when the strip 38 is in position 43 (Fig. 3) the side lines 47 are converged; and when the strip is in the position 44 (Fig. 4) the side lines 47 are diverged.

The strip 38 is so positioned that a flexing thereof varies the width of the cross-section of the light beam and not the thickness of the cross-section; and the width of the cross-section is decreased or increased equally from both ends.

In Fig. 5, 50 is a positive film made from the negative film 46. On this positive film 50 is a light record 51 made with the apparatus shown in Fig. 1. The side lines 52 are symmetric on each side of the center line x—x, and the peaks or crests 53 and 54 are transversely aligned as are the troughs 55 and 56.

One important feature of the invention is the varying of the shape of the light record or light band 51 by curving both side lines thereof. The novelty and new results may be readily understood by reference to Figs. 6 and 7.

In Fig. 6 the usual type of light record is shown at 58. One side line 59 is straight and the other side line 60 is wave-shaped, having a peak or crest 62 and a trough 63. The side lines 59 and 60 are centralized on imaginary base lines A—A and B—B, the crest 62 being above the base line A—A and the trough 63 being therebelow. In the light band 58 shown in Fig. 6 the change in shape is accomplished by the waves in the one side line 60; consequently, the inclined portions 65 are quite steep as compared with the inclined portions 66 of the waves of the side lines 52 of my invention, which waves need be only half the height to obtain the same effect as in the usual light band. By curving or waving both side lines of the light band 51, I am able to record the sound undulations by using relatively shallow waves which have a relatively small slope to their inclined portions 66.

As mentioned heretofore the sound waves of a musical instrument or the voice has small characteristic waves which are represented in Fig. 6 by the numeral 68 and in Fig. 7 by the numeral 69.

Where the inclined portions are steep as in Fig. 6 the mechanism which forms the waves in the side line 60 is moving so fast, because of the height of the waves, that some of the characteristic waves are lost and those recorded are under proper size.

In producing sound from the light record, the inclined portions 65 pass through the light area of the producing apparatus quickly, because the inclined portions are at a relatively large angle to the direction of movement of the film, and therefore the characteristic waves are not fully reproduced.

In my invention the waves are about half the height of the ordinary wave and the control mechanism which forms the waves need only travel half as fast. This enables all of the characteristic waves to be recorded, and in addition they are recorded in duplicate on the transversely aligned portions of the waves. In reproducing the sound the characteristic waves are faithfully reproduced, because the waves are long as compared with their height and the inclined portions 65 are at a relatively small angle to the line of movement of the film.

Figure 9:
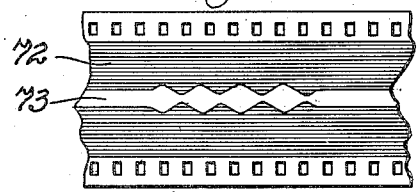
Fig. 9 is a positive film on which the light record of Fig. 8 has been reduced to such a size that the positive may be run at normal speed in the reproducing apparatus.
Figure 12:
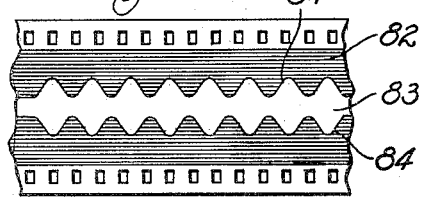
Fig. 12 is a positive film with the light record reduced to one-half the length of the record in Fig. 11, while the magnitude of the waves have been maintained.
Figure 10:
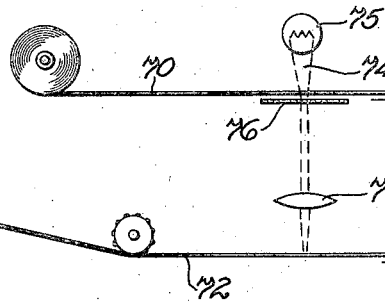
Fig. 10 illustrates the method of making the positive film of Fig. 9 from the negative of Fig. 8.
Figure 13:
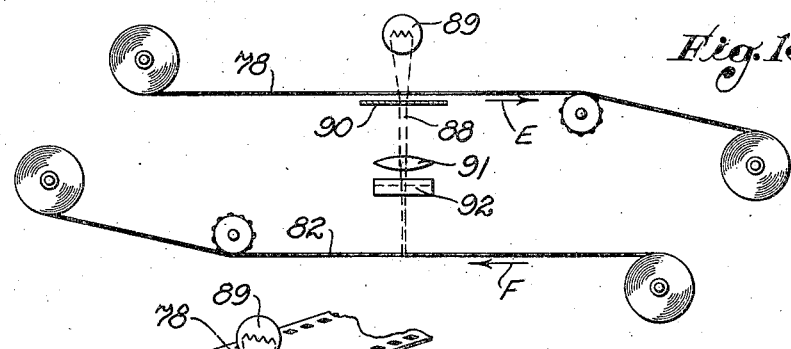
Figs. 13 and 14 are views illustrating the manner of making the positive film of Fig. 12 from the negative of Fig. 11.
Figure 14:
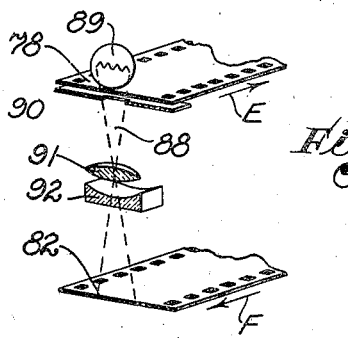

In Figs. 8, 9 and 10 I show a method of making a positive so that all of the characteristic waves may be recorded. In Fig. 8 the negative film 70 has a double size light record 71 formed thereon. This light record is made by using a control apparatus 28 in which the strip 38 is flexed twice the distance that it is ordinarily and by running the negative film at twice the normal speed or two feet per second. This positive film 72 made therefrom has a light record 73 which is half the size of the light record 71, and may be run in the reproducing apparatus at normal speed or at one foot per second.

The positive film 72 may be made as follows, reference being had to Fig. 10. The negative film 70 is run in the direction of the arrow C, and the positive film is run in the direction of the arrow D. Light rays 74 from a light source 75 pass through the negative film 70 and through an aperture plate 76 to a lens 77 which reduces the image of the light record to one-half and impinges this half size image on the positive film 72.

In Figs. 11 to 14 inclusive I illustrate still another form of light record and method of making same. The negative film 78 shown in Fig. 11 during exposure is run at double speed so that the light band 79 has waves 80 which are of normal height but are double length, and the inclined portions are relatively inclined so that the characteristic waves may be faithful reproduced.

The positive film 82 made from the negative film 78 has a light record 83 in which the waves 84 thereof are of the same height as the waves 80 but are half as long so that it may be run at normal speed in the reproducing apparatus.

In making the positive film 82 (Figs. 13 and 14) the negative film 78 is run in the direction of the arrow E, and the positive film 82 is run in the direction of the arrow F. Light rays 88 from a light source 89 pass through the negative film 78 and an aperture plate 90 to a lens 91 which reduces the light band image to half size. The light ray then passes through a cylindrical lens 92 which enlarges the image only in one direction, which is that of the height of the waves of the light bands, which produces the waves 84.

I claim as my invention:

1. A method of making a light record of sound by the use of a light-sensitive film, which includes the steps of, projecting a beam of light from a source onto a surface which may be flexed to cylindrical concavity or convexity in a single plane, flexing said surface in accordance with, and in response to, an electrical effect of the character of the wave of the sound to be recorded, reflecting from said surface a reflected light beam the width of which is dependent upon the shape of said surface, masking said beam of light at a position between said source and said light-sensitive film to form a flat shaft of light of a width varying with the degree of flexing of said surface, and impinging said flat shaft of light upon a light-sensitive film to form a sound record of variable width.

2. A method of recording sound on a photosensitive element, which method includes the steps of: forming a flat shaft of light; reflecting said flat shaft of light to move toward said photosensitive element by disposing in said flat shaft of light a reflecting surface which may be flexed to cylindrical concavity or convexity; flexing said reflecting surface to present to the width of the flat shaft of light a cylindrical surface of varying radius of curvature and in response to the undulations of sound to be recorded to change the width of the flat shaft of light reflected toward said photosensitive element; and moving said photosensitive element relative to said reflected flat shaft of light whereby said shaft of light forms a sound record on said photosensitive element of a width varying with the undulations of the sound to be recorded.

3. A method of recording sounds on a photosensitive element, which method includes the steps of: forming a flat shaft of light; reflecting said flat shaft of light to move toward said photosensitive element, the extreme edges of the reflected flat shaft of light being defined by side lines; changing the relative angular positions of said side lines in response to the sound undulations to be recorded by correspondingly and simultaneously changing the angular position of each side line without changing the thickness of said reflected flat shaft of light, thereby changing the width of said flat shaft of light measured at the surface of said photosensitive element; and moving said photosensitive element relative to said flat shaft of light.

4. In combination in a sound-recording system for recording sounds on a photosensitive element: a light source of constant intensity; a light slit in the path of rays moving from said light source, said light slit forming a flat shaft of light which is symmetric with respect to a medial section thereof and which flat shaft of light is directed in exposing relationship with said photosensitive element; control means responsive to the high frequency sound undulations to be recorded for changing the total width of said flat shaft of light symmetrically with respect to said medial section without changing materially the thickness of said flat shaft of light, said control means including a reflecting means reflecting said rays toward said photosensitive element and including means for mounting opposite ends of said reflecting means to flex into cylindrical shape and including means for flexing said reflecting means in response to said sound undulations to be recorded; and means for moving said photosensitive element relative to said shaft of light whereby a sound track is formed on said photosensitive element with oppositely disposed crests and troughs.

5. In combination in a sound-recording system for recording sounds on a photosensitive element: a light source of constant intensity; a light slit in the path of rays moving from said light source, said light slit forming a flat shaft of light which is symmetric with respect to a medial section thereof and which flat shaft of light is directed in exposing relationship with said photosensitive element; control means responsive to the high frequency sound undulations to be recorded for changing the total width of said flat shaft of light symmetrically with respect to said medial section without changing materially the thickness of said flat shaft of light, said control means including a mirror disposed in the path of said light rays and between said light slit and said photosensitive element whereby said flat shaft of light strikes said mirror, said control means also including means for flexing said mirror in the plane of said flat shaft of light but not transverse thereto in response to the sound undulations to be recorded and in a direction to present cylindrical surfaces of different radius of curvature to said flat shaft of light; and means for moving said photosensitive element relative to said shaft of light whereby a sound track is formed on said photosensitive element with oppositely disposed crests and troughs.

6. In combination in a sound-recording system for recording sounds on a photosensitive element: a deformable member providing a reflecting surface; means for mounting said member to flex in a single plane to bend said reflecting surface in a cylindrical surface extending transverse to said plane; a light source sending light rays toward said deformable member, said reflecting surface reflecting said rays toward said photosensitive element; and a light slit in the path of travel of said rays and extending substantially parallel to said plane to form the rays reaching said photosensitive element into a flat shaft of light, the changing curvature of said reflecting surface changing the width of said shaft of light but not the thickness thereof; and means for moving said photosensitive element relative to said flat shaft of light.

7. A combination as defined in claim 6 in which said deformable member is longer in a direction parallel to said plane than in a direction transverse to said plane.

WILLIAM M. THOMAS.